United States Patent
Barth et al.

(10) Patent No.: US 11,230,955 B2
(45) Date of Patent: Jan. 25, 2022

(54) METHOD FOR PRODUCING AN SCR CATALYTIC CONVERTER BY WAY OF PRE-DRYING

(71) Applicant: UMICORE AG & CO. KG, Hanau-Wolfgang (DE)

(72) Inventors: Benjamin Barth, Alzenau (DE); Martin Foerster, Büdingen (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/962,432

(22) PCT Filed: Jan. 16, 2019

(86) PCT No.: PCT/EP2019/051027
§ 371 (c)(1),
(2) Date: Jul. 15, 2020

(87) PCT Pub. No.: WO2019/141718
PCT Pub. Date: Jul. 25, 2019

(65) Prior Publication Data
US 2021/0071561 A1    Mar. 11, 2021

(30) Foreign Application Priority Data
Jan. 16, 2018 (DE) .................. 10 2018 100 833.3

(51) Int. Cl.
| | | |
|---|---|---|
| F01N 3/20 | (2006.01) |
| F01N 3/28 | (2006.01) |
| B01D 53/94 | (2006.01) |
| B01J 35/04 | (2006.01) |
| B01J 37/02 | (2006.01) |
| B01J 37/08 | (2006.01) |
| B01J 37/30 | (2006.01) |
| B01J 37/34 | (2006.01) |
| B01J 29/76 | (2006.01) |

(52) U.S. Cl.
CPC ....... *F01N 3/2066* (2013.01); *B01D 53/9418* (2013.01); *B01J 29/763* (2013.01); *B01J 35/04* (2013.01); *B01J 37/0215* (2013.01); *B01J 37/0236* (2013.01); *B01J 37/08* (2013.01); *B01J 37/30* (2013.01); *B01J 37/343* (2013.01); *F01N 3/2803* (2013.01); *B01D 2255/20738* (2013.01); *B01D 2255/20761* (2013.01); *B01D 2255/50* (2013.01); *B01D 2255/9155* (2013.01); *B01J 2229/186* (2013.01); *F01N 2370/04* (2013.01); *F01N 2510/06* (2013.01); *F01N 2610/02* (2013.01)

(58) Field of Classification Search
CPC ............ B01D 46/2418; B01D 53/9418; B01D 2255/20738; B01D 2255/20761; B01D 2255/50; B01D 2255/65; B01D 2255/9155; B01D 2257/402; B01D 2257/404; B01D 2258/012; B01J 23/72; B01J 23/745; B01J 29/00; B01J 37/0215; F01N 3/035; F01N 3/2066; F01N 2250/02; F01N 2570/14; F01N 2610/02
See application file for complete search history.

(56) References Cited

U.S. PATENT DOCUMENTS

| | | |
|---|---|---|
| 4,609,563 A | 9/1986 | Shimrock et al. |
| 5,051,244 A | 9/1991 | Dunne et al. |
| 5,953,832 A | 9/1999 | Rosynsky et al. |
| 6,149,973 A | 11/2000 | Foerster et al. |
| 6,478,874 B1 | 11/2002 | Rosynsky et al. |
| 6,548,105 B2 | 4/2003 | Kiessling et al. |
| 6,599,570 B1 | 7/2003 | Aderhold et al. |
| 7,143,578 B2 | 12/2006 | Kakwani et al. |
| 8,640,440 B2 | 2/2014 | Klingmann et al. |
| 8,794,178 B2 | 8/2014 | Mergner et al. |
| 10,258,972 B2 | 4/2019 | Patchett et al. |
| 2004/0098979 A1 | 5/2004 | Hammerle et al. |
| 2008/0107806 A1* | 5/2008 | Mergner ............ B01D 46/2418 427/185 |

FOREIGN PATENT DOCUMENTS

| | | | |
|---|---|---|---|
| CN | 107442163 A | 12/2017 | |
| CN | 107824217 A * | 3/2018 | ......... B01D 53/9418 |
| DE | 101 14 328 A1 | 10/2002 | |
| DE | 699 17 770 T2 | 6/2005 | |
| DE | 10 2010 007 499 A1 | 8/2011 | |
| EP | 0 941 763 A1 | 9/1999 | |
| EP | 1 054 722 B1 | 12/2001 | |
| EP | 1 064 094 B1 | 9/2002 | |
| EP | 1 309 775 A1 | 5/2003 | |

(Continued)

OTHER PUBLICATIONS

International Search Report for PCT/EP2019/051027, dated Apr. 15, 2019 (7 pgs. with English translation).
Written Opinion of the International Searching Authority for PCT/EP2019/051027, dated Apr. 15, 2019 (13 pgs.).
R. Heck, et al. Catalytic Air Pollution Control, Commercial Technology, 1995, S. 90.
G. Tuenter, et al. Kinetics and Mechanism of the $NO_x$ Reduction with $NH_3$ on $V_2O_5$—$WO_3$—$TiO_2$ Catalyst, Ind. Eng. Chem. Prod. Res. Dev. 1986, 25, pp. 633-636.

(Continued)

*Primary Examiner* — Timothy C Vanoy
(74) *Attorney, Agent, or Firm* — Smith, Gambrell & Russell, LLP (57) ABSTRACT

The present invention relates to a method for producing automobile exhaust gas catalytic converters, to the catalytic converters as such and to the use thereof. In particular, the method comprises a step which results, independently of the actual drying process, in the catalytically active material used being dried. The invention is especially used in the coating of wall-flow filters.

18 Claims, 1 Drawing Sheet

(56) References Cited

FOREIGN PATENT DOCUMENTS

| | | |
|---|---|---|
| EP | 1 136 462 B1 | 8/2004 |
| EP | 1 663 458 A1 | 6/2006 |
| EP | 2 042 225 A1 | 4/2009 |
| EP | 2 382 031 A2 | 11/2011 |
| EP | 2 415 522 A1 | 2/2012 |
| EP | 2 521 618 B1 | 8/2013 |
| JP | 5378659 B2 | 12/2013 |
| JP | 2014-205108 A | 10/2014 |
| WO | 99/47260 A1 | 9/1999 |
| WO | 99/55458 A1 | 11/1999 |
| WO | 2005/016497 A1 | 2/2005 |
| WO | 2008/106519 A1 | 9/2008 |
| WO | 2008/118434 A1 | 10/2008 |
| WO | 2008/132452 A2 | 11/2008 |
| WO | 2009/156134 A1 | 12/2009 |
| WO | 2012/075400 A1 | 6/2012 |
| WO | 2013/060341 A1 | 5/2013 |
| WO | 2015/121910 A1 | 2/2015 |
| WO | 2015/049110 A1 | 4/2015 |
| WO | 2016/057285 A1 | 4/2016 |
| WO | 2016/153923 A1 | 9/2016 |
| WO | 2017/080722 A1 | 5/2017 |
| WO | 2017/153239 A1 | 9/2017 |
| WO | 2010/015573 A2 | 2/2020 |

OTHER PUBLICATIONS

Wikipedia https://de.wikipedia.org/wiki/Luftfeuchtigkeit (Humidity) (52 pgs. With English Translation) 2020.
Database of Zeolite Structures, Zeolite Framework Types, http://europe.iza-structure.org/IZA-SC/ftc_table.php 2020.

* cited by examiner

METHOD FOR PRODUCING AN SCR CATALYTIC CONVERTER BY WAY OF PRE-DRYING

The present invention relates to a method for producing automobile exhaust gas catalysts, to the catalysts themselves and to the use thereof. In particular, during production, a working step is used which, independently of the actual drying process, causes a pre-drying of the catalytically active material used. The invention is preferably used in the coating of wall-flow filters.

The exhaust gas of internal combustion engines typically contains the harmful gases carbon monoxide (CO) and hydrocarbons (HC), nitrogen oxides ($NO_x$) and possibly sulfur oxides ($SO_x$), as well as particulates that mostly consist of soot residues and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when the combustion temperatures locally exceed 1400° C. Sulfur oxides result from the combustion of organic sulfur compounds, small amounts of which are always present in non-synthetic fuels. In order to remove these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body or monolith with a catalytically active coating applied thereto. The catalyst facilitates the chemical reaction of different exhaust gas components, while forming non-hazardous products, such as carbon dioxide and water.

The flow-through or wall-flow monoliths just described are accordingly also called catalyst supports, supports or substrate monoliths, as they carry the catalytically active coating on their surface or in the walls forming this surface. The catalytically active coating is often applied to the catalyst substrate in the form of a suspension in a so-called coating operation. Many such processes in this respect were published by automotive exhaust gas catalyst manufacturers in the past (EP1064094B1, EP2521618B1, WO10015573A2, EP1136462B1, U.S. Pat. Nos. 6,478,874, 4,609,563, WO9947260A1, JP5378659B2, EP2415522A1, JP2014205108A2).

U.S. Pat. No. 6,478,874 states that a vacuum is used to draw a washcoat suspension upwardly through the channels of a substrate monolith. U.S. Pat. No. 4,609,563 also describes a process in which a metered charging system is used for the catalytic coating of a substrate. This system comprises a method of coating a ceramic monolithic substrate with a precisely controlled, predetermined amount of the washcoat suspension using a vacuum (hereinafter "metered charge"). The monolithic substrate is immersed in a quantitatively determined amount of washcoat suspension. The washcoat suspension is then drawn by the vacuum into the substrate monolith.

In this case, however, it is difficult to coat the monolithic substrate in such a way that the coating profiles of the channels in the monolithic substrate are uniform.

In contrast, a process is also established, with which a specific amount of washcoat suspension (metered charge) is applied to the top side of an upright substrate monolith, this amount being such that it is practically completely retained within the monolith provided (U.S. Pat. No. 6,599,570). By means of a vacuum/pressure device acting on one of the ends of the monolith, the washcoat suspension is sucked/pressed entirely into the monolith without excess suspension escaping at the lower end of the monolith (WO9947260A1). See in this context also JP5378659B2, EP2415522A1 and JP2014205108A2 of the Cataler company.

In addition to carbon monoxide CO, hydrocarbons HC and nitrogen oxides $NO_x$, the raw exhaust of in particular diesel engines or lean-burn spark ignition engines contains a relatively high oxygen content of up to 15% by volume. Additionally, particulate emissions are included which predominantly consist of soot residues and in some cases organic agglomerates and result from a partially incomplete combustion of fuel in the cylinder.

Complying with future exhaust gas limits for lean internal combustion engines applicable in Europe, North America and Japan requires, in addition to removing hydrocarbons and carbon monoxide, the simultaneous removal of particulates and nitrogen oxides from the exhaust gas. The harmful gases carbon monoxide and hydrocarbons from the lean exhaust gas can easily be made harmless by oxidation on a suitable oxidation catalyst. Diesel particulate filters with and without additional catalytically active coating are suitable aggregates for removing the particulate emissions. The reduction of nitrogen oxides to nitrogen ("denitrification" of the exhaust gas) is more difficult due to the high oxygen content. One known method uses nitrogen oxide storage catalysts, another is selective catalytic reduction (SCR) of the nitrogen oxides on a suitable catalyst, SCR catalyst for short. This method is currently preferred for the denitrification of lean-engine exhaust gases. The nitrogen oxides contained in the exhaust gas are reduced in the SCR method with the aid of a reducing agent metered into the exhaust system from an external source. Ammonia is used as the reducing agent, which converts the nitrogen oxides present in the exhaust gas to nitrogen and water at the SCR catalyst. The ammonia used as the reducing agent may be made available by feeding an ammonia precursor compound, for example urea, ammonium carbamate or ammonium formate, into the exhaust system, and by subsequent hydrolysis.

In order to comply with the statutory standards, it is necessary for the current and future applications for the exhaust gas aftertreatment of lean internal combustion engines to combine diesel oxidation catalyst, diesel particulate filters, nitrogen oxide storage catalyst and/or SCR catalysts, wherein the combination of these aggregates brings about changed operating conditions especially for the SCR catalyst. At this time, three such SCR systems are in testing: In the so-called "SCRT® system" according to EP1054722B1, a diesel oxidation catalyst, a diesel particulate filter and an SCR catalyst are arranged consecutively in the flow direction of the exhaust gas. Alternatively, the SCR catalyst can be arranged between a diesel oxidation catalyst proximate to the engine and a diesel particulate filter in the subfloor of the vehicle (DOC-SCR-DPF) in accordance with US20040098979A1 or in front of a unit consisting of diesel oxidation catalyst and diesel particulate filter (SCR-DOC-DPF) in accordance with WO2009156134A1.

Certain metal-exchanged zeolites or zeotypes can be used as SCR catalysts, for example. Zeolites/zeotypes are often subdivided by the ring size of their largest pore openings into large-, medium- and small-pore zeolites/zeotypes. Large-pore zeolites/zeotypes have a maximum ring size of 12 and medium-pore zeolites/zeotypes have a maximum ring size of 10 tetrahedral atoms. Small-pore zeolites/zeotypes (abbreviation: SPZ from small pore zeolite/zeotype)

have a maximum ring size of 8 tetrahedral atoms (see also: http://europe.iza-structure.org/IZA-SC/ftc_table.php; WO 2017080722A1).

While, for example, SCR catalysts based on iron-exchanged A-zeolites, i.e. a large-pore zeolite, have been and continue to be widely used in heavy-duty vehicles, SCR catalysts based on small-pore zeolites are becoming increasingly important, see for example WO2008/106519A1, WO2008/118434A1 and WO2008/132452A2.

WO2008/132452A2 describes a small-pore zeolite exchanged with, for example, copper, which can be coated as a washcoat onto a suitable monolithic substrate or extruded to form a substrate. The washcoat may contain a binder selected from the group consisting of aluminum oxide, silica, (non-zeolitic) silica-alumina, natural clays, $TiO_2$, $ZrO_2$ and $SnO_2$.

WO2013/060341A1 describes SCR-active catalyst compositions from a physical mixture of an acidic zeolite or zeotype in protonic form or in iron-promoted form with, for example, $Cu/Al_2O_3$.

WO2012/075400A1 describes a catalyst composition consisting of a CHA zeolite containing copper or iron for SCR applications with which the average crystal size preferably has a majority of crystal sizes of more than approximately 0.5 μm. The zeolites are applied to the supports as an aqueous washcoat suspension. Information for setting the grain size, for example by grinding grain in a ball mill or by means of other grinding methods, are not found in the application. Zeolites or zeotypes, however, are not only used in SCR catalysts. Especially in diesel oxidation catalysts, these frequently play an important role as hydrocarbon scavengers at low temperatures (HC trap). These have already been described even as nitrogen oxide stores. In the production of catalysts which contain metal ion-exchanged zeolites or zeotypes, the procedure is essentially carried out according to the knowledge of the person skilled in the art, such that an ion exchange takes place in the zeolite or zeotype in an initial step. In this case, the ions present in the zeolite or zeotype are replaced by those which have emerged as catalytically active for the reaction under consideration. Consequently, this mixture is then applied, optionally after prior washing with water, with or without admixing a binder, to the support, generally a flow-through support or wall-flow filter, with the coating techniques described above. In this case, the coating can then be present on the walls of the supports and/or in the pores of the walls forming the channels of the supports. Exemplary production variants of such catalysts can be found in WO2008/106519A1 or WO2005/016497A1.

After coating the catalyst supports with a washcoat suspension, they are dried in a conventional manner by evaporation of the solvent, generally water, before a further coating process and/or calcination take place. The evaporation process can be accelerated by passing heated air through the catalyst substrate. The heated air can either be passed exclusively through the interior of the perpendicularly standing catalyst support in a forced manner from below by a blower or alternatively in a batch process in a circulating air drying cabinet or continuously in a continuous furnace with convection.

An improvement of this drying method with heated air is described in WO9955458A1, which mentions a method for drying throughflow-type coated catalyst supports. With this method, a gas stream is sucked to the end of the support opposite the coating direction by applying a vacuum and at the same time a heated gas stream is supplied from the other end. No further influencing of the coating profile should occur in this case. The gas stream serves to remove a moisture film in the channels that would otherwise clog the channels. The air used for drying is heated to temperatures of 82° C. to 371° C. and passed through the catalyst support at a volumetric flow rate of approximately 40 m3/min for approximately 40 seconds. The velocity of the gas stream is in the order of magnitude of approximately 4 m/s. The water content of the applied washcoat layer is reduced by 43-67% in this drying process with vacuum support as a function of the temperature of the gas stream from 121° C. to 177° C. and by 25-37% only with heated air without a vacuum.

WO2016153923A1 describes a similar system and a comparable method for calcining coated substrates with an upstream drying step. In a first process step, the liquid of the coating suspension is evaporated by applying a vacuum and passing a heated gas stream through. The flow rate of the gas stream is set to approximately 5 to approximately 11 m$^3$/min at a gas temperature of 100° C. to 115° C. for a duration of 5 to 30 seconds. After this first evaporation step, drying of the washcoat layer then takes place at a temperature of the gas stream of 170° C. to 235° C. for a further 5 to 30 seconds before the calcination takes place. No metal ion-exchanged zeolites are mentioned in this application.

Patent specification EP941763A1 describes a method for coating catalyst supports with a washcoat suspension which, after coating the support, provides a pre-drying step before the actual calcination. Through this pre-drying, in which preheated air flows through the support from below at temperatures between 20° C. and 150° C. and speeds of more than 4, preferably 7-10 m/s, for the duration of 5 to 20 s, the blocking of the flow channels or a narrowing of the channels at the lower end of the catalyst bodies can be avoided. In this patent specification, no information is given on the achieved degree of pre-drying of the washcoat layer.

Automobile exhaust catalysts must meet ever higher requirements due to the falling statutory limits for harmful automobile exhaust gases. It is therefore a permanent object for research to provide ever more effective and better automobile exhaust gas catalysts.

These and other objects which are obvious to the person skilled in the art from the prior art are achieved by the specification of catalysts, their production and their use in accordance with the claims.

Figure 2:
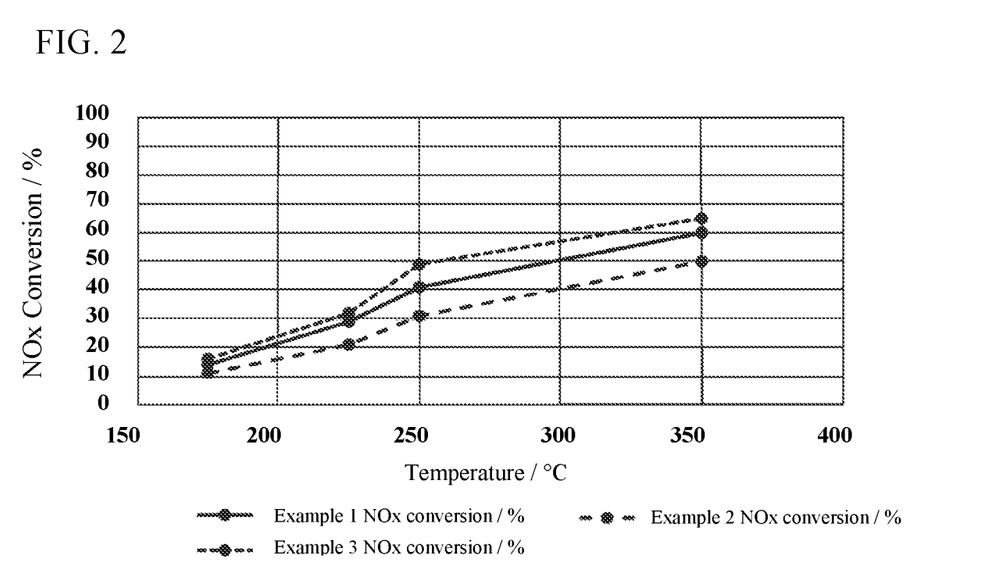
FIG. 2 shows the NOx conversion of Examples 1-3 at T=175° C.–350° C.

The object is achieved in that, in a method for producing a catalyst containing a zeolite or zeotype for the aftertreatment of exhaust gases of an internal combustion engine, wherein the zeolite or the zeotype is a metal Ion-exchanged zeolite or the zeotype, in particular a metal ion-exchanged SPZ, one proceeds in such a way that, after its coating onto and/or into a support, a gas stream is guided through it for a sufficient period of time and with a sufficient intensity, so that the solids content in the applied washcoat layer is set to 45%-60%, preferably 45%-60%, more preferably 50%-60%, before the support is completely dried and/or calcined. By treating the supports coated with metal ion-exchanged zeolites or zeotypes by means of a pre-drying step according to the invention, the activity of the final catalysts can surprisingly be increased, which was not previously expected (FIG. 2). In addition, the actual drying time can be drastically reduced, which leads to the fact that the use of the additional pre-drying step on balance leads to a net shortening of the overall process duration.

In principle, all types or mixtures of zeolites or zeotypes suitable to the person skilled in the art for the corresponding field of application can be used. These include naturally occurring but preferably synthetically produced zeolites. These can have framework types, for example, from the group consisting of beta, ferrierite, Y, USY, ZSM-5, ITQ. Examples of synthetically produced small-pore zeolites and zeotypes that are suitable here are those that belong to the structure types ABW, ACO, AEI, AEN, AFN, AFT, AFX, ANA, APC, APD, ATN, ATT, ATV, AWO, AWW, BIK, BRE, CAS, CDO, CHA, DDR, DFT, EAB, EDI, EPI, ERI, ESV, GIS, GOO, IHW, ITE, ITW, JBW. KFI, LEV, LTA, LTJ, MER, MON, MTF, NSI, OWE, PAU, PHI, RHO, RTE, RTH, SAS, SAT, SAV, SIV, THO, TSC, UEI, UFI, VNI, YUG and ZON. Preferably, those of the small-pore type are used which derive from a structure type from the group consisting of CHA, LEV. AFT, AEI, AFI, AFX, KFI, ERI, DDR. Those derived from the CHA, LEV, AEI, AFX, AFI or KFI framework are particularly preferred here. A zeolite of the AEI or CHA type in this context is very particularly preferred. Mixtures of the mentioned species are also possible. The SAR value of the zeolite or the corresponding value in the zeotype (e.g. SAPO→(Al+P)/2Si) should be in the range from 5 to 50, preferably 10 to 45 and very preferably 20 to 40.

For a correspondingly good activity, for example in the SCR reaction, it is necessary for the zeolites or zeotypes and in particular those of the small pore type to be exchanged with metal ions, in particular transition metal ions. Here, the person skilled in the art can use the metal ions which can preferably be used for the corresponding reaction. Metal ions from the group of platinum metals, in particular platinum, palladium and rhodium, for example, have emerged for the oxidation of hydrocarbons, while for example the SCR reaction has been shown to be most effective with zeolites or zeotypes exchanged with iron and/or copper ions. The person skilled in the art will know how such an ion exchange can take place (for example WO2008/106519A1). The degree of exchange (number of ions at exchange sites/total number of exchange sites) should be between 0.3 and 0.5. What is meant here by exchange sites are those at which the positive ions compensate for negative charges of the mesh. Further non-exchanged metal ions, in particular Fe and/or Cu ions, can preferably also be present in the final SCR catalyst. The ratio of exchanged to unexchanged ions is >50:50, preferably 60:40-95:5 and more preferably 70:30-90:10. The ions seated on exchange sites are visible in electron spin resonance analysis and can be quantitatively determined (Quantitative EPR, Gareth R. Eaton, Sandra S. Eaton, David P. Barr, Ralph T. Weber, Springer Science & Business Media, 2010). All non-ion exchanged cations are located at other locations within or outside the zeolite/zeotype. The latter do not compensate for a negative charge of the zeolite/zeotype framework. They are invisible in EPR and can thus be calculated from the difference between the total metal loading (for example determined by ICP) and the value determined in the EPR. The addition of the corresponding ions to the coating mixture is controlled in such a way that the total amount of metal ions, in particular Fe and/or Cu ions, is 0.5-10% by weight, preferably 1-5% by weight, of the amount of coating in the final total catalyst.

In addition to the components just discussed, the coating suspension may also contain further constituents. These components can further support the catalytic function of the catalytically active material, but do not actively intervene in the reaction. Materials used here are, for example, so-called binders. The latter ensure, among other things, that the materials and components involved in the reaction can adhere sufficiently firmly to the corresponding substrate. In this context, binders selected from the group consisting of aluminum oxide, titanium dioxide, zirconium dioxide, silicon dioxide or oxide hydroxides thereof (for example boehmite) or mixtures thereof have proven to be advantageous components. Advantageously, high-surface aluminum oxides are used here. The binder is used in a certain amount in the coating. Based on the solid material used in the coating suspension, the further constituent, for example the binder, is used in an amount of max. 25% by weight, preferably max. 20% by weight and very particularly preferably in an amount of 5% by weight 15% by weight.

The coating suspension thus formed has customary solids contents of 25 to 45%, particularly 30 to 45% and very particularly 35 to 42%. The viscosity (viscosity: DIN 53019-1:2008-09—latest version valid on the date of application) at a shear rate of 1/s is advantageously 0.01-10 Pa·s, preferably 0.02-2 Pa·s and particularly preferably 0.05-1.5 Pa·s. The shear rate-dependent viscosity can be measured with a plate cone rheometer (manufacturer Malvern, type Kinexus or manufacturer Brookfield, type RST). The coating suspension is applied to the supports according to the knowledge of the person skilled in the art (see introductory literature references in this respect). The term coating is to be understood to mean the application of the frequently aqueous suspension of catalytically active materials and optionally further constituents (also called washcoat) to a largely inert supporting body, which can be a wall-flow filter or flow-through monolith. The coating layer thus assumes the actual catalytic function. After the application of the suspension, the support is dried as described at the outset and, if applicable, calcined at increased temperature. The coating may consist of one layer or be made up of multiple identical or different layers that are applied atop one another (multi-layered) and/or offset relative to one another (zoned) onto a supporting body.

A substrate of the wall-flow type (wall-flow filter) or of the flow-through type can be used here as the support. Flow-through monoliths are conventional catalyst supports in the prior art, which can consist of metal (corrugated carrier, for example WO17153239A1, WO16057285A1, WO15121910A1 and literature cited therein) or ceramic materials. Refractory ceramics, such as cordierite, silicon carbide or aluminum titanate, etc. are preferably used. The number of channels per area is characterized by the cell density that typically ranges between 300 and 900 cells per square inch (cpsi). The wall thickness of the channel walls in ceramics is between 0.5-0.05 mm.

All ceramic materials customary in the prior art can be used as wall-flow monoliths or wall-flow filters. Porous wall-flow filter substrates made of cordierite, silicon carbide or aluminum titanate are preferably used. These wall-flow filter substrates have inlet and outlet channels, wherein the respective downstream ends of the inlet channels and the upstream ends of the outlet channels are offset against each other and closed with gas-tight "plugs." In this case, the exhaust gas that is to be purified and which flows through the filter substrate is forced to pass through the porous wall between the inlet channel and outlet channel, which delivers an excellent particulate filter effect. The filtration property for particulates can be designed by means of porosity, pore/radii distribution, and thickness of the wall. The catalyst material may be present in form of washcoat suspensions in and/or on the porous walls between the inlet and outlet channels. Wall-flow monoliths that were extruded directly or with the aid of binders from the corresponding catalyst materials, meaning that the porous walls directly consist of the catalyst material, such as can be the case in the case of SCR catalysts based on zeolite or vanadium, may also be used. Such extruded SCR monoliths can also be provided, as described above, with a washcoat suspension in and/or on the porous walls. Preferably used substrates may be taken from EP1309775A1, EP2042225A1 or EP1663458A1. The porosity of the wall-flow filters is typically more than 40%, generally from 40% to 75%, particularly from 45% to 70% [as measured according to DIN 66133—latest version on the date of application]. The average pore size is at least 7 µm, for example from 7 µm to 34 µm, preferably more than 10 µm, in particular from 10 µm to 20 µm, or from 21 µm to 33 µm [measured according to DIN 66134, latest version on the date of application]. The finished and coated filters with a pore size of typically 10 µm to 33 µm and a porosity of 50% to 65% are particularly preferred. A corresponding support of the wall-flow type (wall-flow filter) is very particularly preferably used in the present case.

In the pre-drying step according to the invention, a gas stream is guided for a sufficient period of time in order to set the solids content according to the claims. It should preferably be as short as possible. On the other hand, the period of time should be selected in such a way that the corresponding solids content can be reliably obtained for all supports. As a rule, the period of time will be between 10 seconds and 2 minutes, preferably between 15 seconds and 1 minute and more preferably the gas stream lasts for a period of time of 15 to 40 seconds, most preferably >20 to <40 seconds.

Furthermore, the temperature of the gas stream should be set accordingly. It has been found to be advantageous if the gas stream does not exceed a temperature of 60° C. As a rule, the temperature of the gas stream during the pre-drying will be between 15° C.-50° C. and very particularly preferably between 20° C.-45° C.

In the method according to the invention, it is advantageous if the relative humidity of the gas flowing through the support during the method step in accordance with the invention is particularly adapted. All gases which are suitable to the person skilled in the art for drying and are selected from the group consisting of air, $CO_2$, $N_2$, noble gases or mixtures of these can be used as the gas. Optionally, reactive gases such as $H_2$ or $O_2$ can be admixed. Air is preferably used. It has proven to be favorable, in particular with regard to the use of air, to use relatively dry gas for the pre-drying. The relative humidity of the gas, in particular air (http://de.wikipedia.org/wiki/Luftfeuchtigkeit), should be reduced to values of less than 5 g of water per kilogram of gas/air. Preferably, less than 4 g of water per kilogram of gas/air, particularly preferably less than 3 g of water per kilogram of gas/air, is used.

In the method according to the invention, the gas stream is generated by a pressure difference of more than 20 mbar between the inlet and outlet sides of the support. In the process according to the invention, the pre-drying is further preferably carried out with a pressure difference for passing the gas stream through from 20 to 600 mbar, particularly preferably from 100 to 500 mbar, between the inlet and outlet sides. It must be taken into account here that larger pressure differences of 50-600 mbar, preferably 100-500 mbar and particularly preferably 150-400 mbar, are useful for the application of wall-flow filters. In the case of flow-through supports, pressure differences of 20-400 mbar, preferably 50-350 mbar and particularly preferably 80-300 mbar are suitable. In the case of wall-flow filters, this minimum pressure difference ensures that small (5-10 µm) and medium (10-20 µm) channels and passages are presumably also accessible through the cell walls for the passage of air, resulting in a lower increase in pressure in the exhaust system in use. This means that more catalytically active material can be available for conversion of the pollutants.

The pressure difference may be generated by applying an overpressure to one end of the support. Alternatively, the pressure difference may also be produced by applying a negative pressure to one end of the support. Further, it is possible to implement both measures together. A negative pressure is preferably used in the method according to the invention. Most preferably, the gas stream is sucked through the support in the direction of coating. Most preferably, air is used for this purpose.

The present invention likewise relates to a catalyst produced according to the invention for the aftertreatment of exhaust gases of an optionally lean internal combustion engine, in particular a corresponding SCR catalyst. Most preferably, the support is a wall-flow filter. This has a loading with the dry coating suspension of 30-200 g/l, preferably 50-160 g/l and very particularly preferably 80-145 g/l. The majority of the coating (>50%, more preferably >75% and particularly preferably >85%) is present in the pores of the filter. This applies very particularly advantageously to the coating of the wall-flow filter with an SCR catalyst based on metal ion-exchanged zeolites or zeotypes. The supports produced by the method according to the invention have an extremely low gradient with respect to the washcoat concentration in the axial direction or with respect to the copper content in the axial direction. The gradient of the supports is preferably less than 10%, preferably less than 5% and particularly preferably less than 3% with respect to the washcoat concentration and/or the copper content measured in the axial direction.

The present invention likewise relates to the use of a catalyst according to the invention for aftertreatment of exhaust gases of an internal combustion engine. In principle, all exhaust gas aftertreatments which are suitable to the person skilled in the art for this purpose can be used as such. Corresponding zeolites and zeotypes as mentioned at the outset are present in, inter alia, TWCs (three-way catalysts, in particular as GPFs in stoichiometric exhaust gas), DOCs (diesel oxidation catalysts). PNAs (passive NOx absorbers), LNTs (nitrogen oxide storage catalysts) and in particular in SCR catalysts. The catalysts produced using the method according to the invention are suitable for all these applications. The use of these catalysts for the treatment of exhaust gases of a lean internal combustion engine is preferred. Most preferably, the catalysts produced accordingly find application in the selective reduction of nitrogen oxides by means of ammonia (SCR treatment), in particular in the form of a wall-flow filter.

For SCR treatment of the preferably lean exhaust gas, ammonia or an ammonia precursor compound is injected into the latter and both are guided over an SCR catalyst according to the invention. The temperature above the SCR catalyst should be between 150° C. and 500° C., preferably between 200° C. and 400° C. or between 180° C. and 380° C., so that the reduction can take place as completely as possible. A temperature range of 225° C. to 350° C. for the reduction is particularly preferred.

Furthermore, optimum nitrogen oxide conversions are only achieved when there is a molar ratio of nitrogen monoxide to nitrogen dioxide ($NO/NO_2=1$) or the ratio of $NO_2/NOx$ is ~0.5 (G. Tuenter et al., Ind. Eng. Chem. Prod. Res. Dev. 1986, 25, 633-636). Optimum conversions beginning with 75% conversion already at 150° C. with simultaneous optimum selectivity to nitrogen are achieved in accordance with the stoichiometry of the reaction equation $$2\ NH_3 + NO + NO_2 \rightarrow 2\ N_2 + 3\ H_2O$$

only with a NO$_2$/NOx ratio of around 0.5. This applies not only to SCR catalysts based on metal ion-exchanged zeolites, but to all common, i.e. commercially available SCR catalysts.

The injection devices used can be selected arbitrarily by the person skilled in the art. Suitable systems can be found in the literature (T. Mayer, Feststoff-SCR-System auf Basis von Ammoniumcarbamat, Dissertation, TU Kaiserslautern, 2005). The ammonia can be introduced into the exhaust gas stream via the injection device as such or in the form of a compound which ammonia creates under ambient conditions. Suitable compounds are, inter alia, aqueous solutions of urea or ammonium formate, as well as solid ammonium carbamate. These can be taken from a provided source known per se to the person skilled in the art and can be added to the exhaust gas stream in a suitable manner. The person skilled in the art particularly preferably employs injection nozzles (for example EP0311758A1). By means of these, the optimum ratio of NH$_3$/NOx is set so that the nitrogen oxides can be converted to N$_2$ as completely as possible.

It has been found to be particularly advantageous for the production of the catalysts according to the invention if the pre-drying according to the invention is combined with a process step in which the coating suspension is treated with ultrasound before the coating of the support. In this process step upstream of the pre-drying according to the invention, the coating suspension is subjected to ultrasound treatment prior to coating onto the support. In the method according to the invention for producing a catalyst containing zeolites or zeotypes for the aftertreatment of exhaust gases of an internal combustion engine, wherein the zeolite or the zeotype is a metal ion-exchanged SPZ, the zeolite or zeotype is advantageously treated before coating onto and/or into a support by means of ultrasound in such a way that the size of the majority of the solids particles ($d_{50}$) are reduced to below 10 μm, preferably below 7 μm and particularly preferably the d99 value is reduced to below 7 μm. The size of the solids particles is measured by means of the laser diffraction method in an aqueous suspension of the zeolites according to ISO 13320-1 (latest version valid on the date of application). A lower limit for the particle size can be determined by the person skilled in the art and is advantageously to be settled at >0.1 μm, more preferably >0.5 μm.

The ultrasound treatment of the coating suspension prior to applying to the support can take place according to the knowledge of the person skilled in the art. For this purpose, the zeolite-containing/zeotype-containing suspension can be pumped, for example, in circulation through a chamber with an ultrasonic sonotrode. The deagglomeration, comminution and/or dispersion of the particles by the ultrasound is based on the principle of action of cavitation. High-frequency electrical energy is converted into mechanical oscillations (ultrasound) by means of so-called ultrasound oscillators (for example from piezo zirconium titanate (PZT)). In this way, very small vacuum bubbles are generated in the liquid, which immediately implode again and comminute the powder particles as a result of the resulting pressure surges. The comminution effect is in this case a function of the amplitude of the ultrasound (energy), the frequency and the sonication duration.

Most preferably, the size of the solids particles after the ultrasonic treatment of the coating suspension is below 7 μm ($d_{50}$), more preferably below 7 μm ($d_{80}$) and very particularly preferably below 7 μm ($d_{99}$). To this end, an ultrasonic source acts on the coating suspension in such a way that the ultrasound preferably has an amplitude of 5-100 μm, more preferably 10-35 μm and very preferably 15-25 μm. The frequency of the ultrasound used is advantageously 5-30 kHz, more preferably 10-25 kHz and very preferably 15-20 kHz. The power irradiated thereby should preferably be from 500-50,000 watts, more preferably 1000-30,000 watts and very particularly preferably 2000-20,000 watts.

The present invention therefore also preferably relates to the combined methods (ultrasonic treatment and pre-drying) and to the catalysts originating from the combined methods and to their use in exhaust gas aftertreatment, in particular in SCR treatment of automobile exhaust gases of lean-burn engines, preferably by means of a wall-flow filter as a support. The preferred embodiments of the method, of the catalyst and of its use which are mentioned above for the pre-drying also apply mutatis mutandis to the subject matter which is directed to the additional ultrasound treatment considered here.

In the present document, lean combustion is often mentioned. The combustion air ratio (A/F ratio; air/fuel ratio) sets the air mass $m_{L,actual}$ which is actually available for combustion in relation to the minimum required stoichiometric air mass $m_{L,st}$, which is required for complete combustion:

$$\lambda = \frac{m_{L,tats}}{m_{L,st}}$$

If λ=1, the ratio applies as a stoichiometric air-fuel ratio where mL,tats=mL,st; this is the case if all fuel molecules can theoretically react fully with the atmospheric oxygen, without the absence of oxygen or without unburned oxygen being left over.

The following applies to combustion engines:
λ<1 (for example 0.9) means "lack of air": rich exhaust gas mixture
λ>1 (for example 1.1) means "surplus air": lean exhaust gas mixture
Statement: λ=1.1 means that 10% more air is present than would be necessary for the stoichiometric reaction. This is, at the same time, designated as surplus air. However, an air-fuel mixture is preferably maintained during the regeneration, which corresponds to a lambda value of 0.8 to 1. This value is particularly preferably between 0.85 and 0.99, and especially preferably between 0.95 and 0.99.

When lean-burn automobile engines or lean internal combustion engines are mentioned in the present text, reference is hereby made mainly to diesel engines and predominantly on average lean-burn spark ignition engines. The latter are gasoline engines predominantly operating on average with a lean A/F ratio (air/fuel ratio). The expression "predominantly on average" thereby takes into consideration the fact that, for example, modern stoichiometrically operated gasoline engines are not statically operated with a fixed air/fuel ratio (A/F ratio; A value). For example, for "predominantly on average stoichiometrically" burning spark ignition engines, three-way catalysts containing oxygen storage material are used in the exhaust system. These are impinged upon by the spark ignition engines with exhaust gas with a discontinuous course of the air ratio λ. They involve a periodic change of the air ratio λ in a defined manner, and thus a periodic change in oxidizing and reducing exhaust gas conditions. This change in the air ratio λ is in both cases significant for the exhaust gas purification result. To this end, the A value of the exhaust gas is regulated with a very short cycle time (ca. 0.5 to 5 Hertz) and an amplitude Δλ of 0.005≤Δλ≤0.07 at the value λ=1 (reducing and oxidizing exhaust gas components are present in a stoichiometric relationship to each other). Therefore, on average, the exhaust gas under such operating conditions should be described as "on average" stoichiometric. In order for these deviations to not have a negative effect on the purification results of exhaust gas when the exhaust gas flows over the three-way catalyst, the oxygen-storing materials contained in the catalyst balance out these deviations to a certain degree by absorbing oxygen from the exhaust gas and releasing it into the exhaust gas as needed (Catalytic Air Pollution Control, Commercial Technology, R. Heck et al., 1995, p. 90). However, due to the dynamic manner of operation of the engine in the vehicle, further deviations from this condition also occur intermittently. For example, under extreme acceleration or during braking while coasting, the operating conditions of the engine, and thus of the exhaust gas, can be adjusted and can, on average, be hypostoichiometric or hyperstoichiometric. However, predominantly, i.e. in the predominant time of combustion operation, the stoichiometrically burning spark ignition engine has an on average stoichiometric combustion. With regard to lean-burn engines, this applies mutatis mutandis. These have, for example, a lean-burn spark ignition engine and thus an exhaust gas which predominantly, i.e. in the predominant time of the combustion mode, has a lean air/fuel ratio on average, i.e. over time.

Zeolites and zeotypes are defined in WO2015049110A1. The definition there is also taken as a basis for this invention.

ISO 13320-1 (latest version valid on the date of application) describes the method widely used in the art for determining the grain size distribution of particles in the nanometer and micrometer range via laser diffraction. In laser diffraction, particle size distributions are determined by measuring the angular dependence of the intensity of scattered light of a laser beam penetrating a dispersed particle sample. The essential factors for characterizing the particle size distribution are the d10, d50, d90 and d99 values based on the number of particles in the sample. The d50 or also the central or median value, for example, indicates the mean value of the particle sizes and means that 50% of all particles are smaller than the given value. For the d10 value, 10% of all particles are smaller than this value and 90% are larger. Corresponding definitions apply for the d90/d99 value (http://www.horiba.com/omerficproducts/partcle-characterization/education/general-information/data-interpretation/gling-particle-size-distribution-schedulation/).

DETAILED DESCRIPTION

Figure 1:
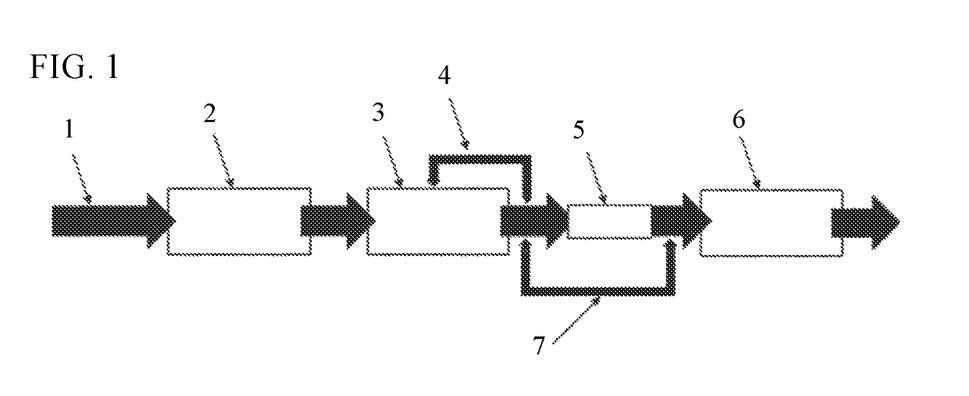
FIG. 1 schematically illustrates the implementation of the method according to the invention.

Surprisingly, it has been found that, with the pre-drying in accordance with the invention of a support, in particular a filter, coated with a metal ion-exchanged zeolite or zeotype, the solids content of the coating can be adapted by passing a gas through at a certain pressure difference and a certain temperature and a certain moisture content of the gas in such a way that better activity of the final catalyst can be achieved (FIG. 2). FIG. 1 schematically illustrates the implementation of the method according to the invention. Preferably air as gas (1) with a temperature of at most 60° C. (3) and (4) and a moisture content of less than 5 g of water/kg of air (2) with a pressure difference (7) of more than 50 mbar between the inlet and outlet of the support (5) results in fixing the washcoat on or in the cell walls of the channels of the substrate (5) and thus prevents the uncontrolled separation and migration of the moist washcoat and its components. After being passed through, the moist gas stream is guided over a separator (6). Compared to the drying processes conventionally used, this has the consequence that the washcoat has a significantly lower concentration gradient and the channels no longer become blocked and clogged. This has the result that, for example, wall-flow filters which have been coated and dried with zeolite or zeotype-containing washcoat according to this method have a significantly increased catalytic effectiveness (FIG. 2) and at the same time a lower exhaust gas back pressure. It is assumed that the lower decrease in viscosity as a result of the use of cool and dry air in combination with a certain gas velocity leads to the stabilization of the moist coating. In particular, it is advantageous if the air used for pre-drying is preconditioned to a moisture content of less than 5 g of water per kilogram of air. This can be done by dehumidification methods known to the person skilled in the art. Typically, in the art, physical methods such as condensation by temperature reduction or adsorption of water vapor on hygroscopic fluids (aqueous solutions of alkali metal chlorides) or solids (molecular sieves, silica gel, etc.) are used for dehumidifying air. The dehumidification of the drying air by adsorption on molecular sieves has proven to be particularly advantageous for the process according to the invention, since in this way a very low relative humidity can be realized with a simultaneously high gas velocity.

No publication of the prior art has so far described a drying method which sets the solids content in the washcoat layer applied here on the support to values of 45-60%, in which the wet layer is dewatered by passing dry, relatively cool air through at high flow rates due to the applied pressure difference. The method according to the invention may be referred to as low-temperature pressure difference pre-drying due to the process parameters.

FIG. 1
1. Gas stream
2. Air dehumidification
3. Temperature setting
4. Temperature control
5. Substrate
6. Separator
7. Pressure difference measurement

EXAMPLES

A basic embodiment of the method is reproduced in the following in FIG. 1. The process for producing a catalyst containing metal ion-exchanged zeolites or zeotypes for the aftertreatment of exhaust gases of an internal combustion engine consists advantageously of the following method steps:
a) Determining the dry weight of the support, in particular a wall-flow filter;
b) Coating the support with the required loading of washcoat using a conventional method;
c) Determining the wet weight of the coated support;
d) Optionally inserting the support into a holding device having gas-tight connections at the inlet and outlet sides of the filter (if different from step b));
e) Applying a pressure difference between the inlet and outlet sides of the support via a suction or pressure blower;

f) Conditioning the air stream prior to entry into the support by dehumidifying the air stream to a water content of less than 5 g of water per kilogram of air;
g) Tempering the gas stream to a temperature of less than 60° C.;
h) Determining the water loss through the pre-drying after passing the conditioned air through;
i) Drying the washcoat layer at temperatures greater than 60° C.;
j) Calcination of the washcoat layer at temperatures greater than 400° C.

The method according to the invention of low-temperature pressure difference pre-drying comprises process steps d) to h). The passage of the air can take place in the coating direction of the washcoat or by rotating the support opposite the coating direction. Pre-drying preferably takes place through suction of air in the coating direction.

The weight loss during the pre-drying can be controlled automatically (inline) by a weighing unit integrated into the holding device for the support or in a separate weighing step after the pre-drying. The duration of the pre-drying step is controlled in this manner until a solids content in the wet washcoat layer from 45% to 60% has been established. The solids content of the washcoat layer is defined as the proportion of all solids in the total weight of the washcoat applied and is calculated after determination of the moisture loss by weighing according to the following formula:

$$FSG2 = MWC * FSG1 / (MWC - MH_2O)$$

FSG1: Solids content of the washcoat suspension
FSG2: Solids content in the pre-dried layer
MWC: Amount of washcoat suspension applied
MH2O: Measured moisture loss As is customary in the production of catalytically active monoliths and filters, the coated supports are then finally dried in a convection oven at temperatures between 100 and 150° C. and calcined in a subsequent annealing step at temperatures between 400° C. and 700° C.

Characterization of the Filters a) Determination of the Washcoat Gradient

The washcoat gradient, i.e. the axial distribution of the mass of catalytic substance and in some cases also the radial concentration differences, generally have a negative influence on the catalysis, the pressure loss and the filtration efficiency due to the uncontrolled flow of the applied washcoat suspension in the conventional circulating air drying methods with hot air. The long drying times in the case of vertically standing supports result in considerable concentration differences in the axial direction due to gravity, and additionally the fact that the support is heated by hot air, preferably from the outside, also results in a gradient in the radial direction. In both cases, the low-temperature pressure differential pre-drying according to the invention brings about a significant improvement.

The washcoat gradient is measured on the calcined support in an X-ray spectrometer (manufacturer Panalytical, type Axios, 4 kW Rh tube). For this purpose, for example, the calcined filter is divided into three segments in the axial direction and the concentration of copper oxide and aluminum oxide in relation to a reference is determined semi-quantitatively. The gradient given in Table 3 is calculated from the arithmetic mean of the maximum and minimum weight proportions of aluminum oxide and copper oxide and is a measure for the evenness of the distribution of the washcoat layer.

b) Determination of the Exhaust Gas Back Pressure in a Wall-Flow Filter as Substrate The exhaust gas back pressure is the dynamic pressure which is established by the friction of the flowing gas stream when passing through the porous filter walls. The exhaust gas back pressure is determined in the cold flow (20° C.) on a dried or calcined filter support by measuring the pressure difference when flowing through with an air flow of, for example, 300 m³/h or 600 m³/h. The exhaust gas back pressure is given as a pressure difference in mbar between the inlet and outlet sides of the filter. The percentage dynamic pressure increase given in Table 3 is calculated in relation to the uncoated substrate.

c) Determination of the Conversion Rate

To determine the catalytic effectiveness of the coated supports—here, a coated filter (Table 2)—these are aged after calcination for 16 hours under hydrothermal conditions (10% water) at 800° C. and then tested for their activity in the selective catalytic reduction of NOx in a model gas test stand, in the present case in a dynamic ammonia breakthrough criterium-based test with the gas conditions shown in Table 1.

TABLE 1

| Gas composition of testing of the catalytic activity at a model gas test stand at T = 175° C., 225° C., 250° C. and 350° C. | |
|---|---|
| Gas | Proportion |
| NOx | 500 ppm |
| NO2 | 0 ppm |
| NH3 | 750 ppm |
| O2 | 10% by volume |
| CO | 350 ppm |
| C3H6 | 100 ppm |
| H2O | 5% by volume |
| N2 | Remainder |

A ceramic filter consisting of a support body made of silicon carbide (manufacturer NGK) with a porosity of 63% at an average pore size of 20 μm in the dimensions was used for the present tests:

TABLE 2

| Filter support data | |
|---|---|
| Diameter | 165 mm |
| Length | 140 mm |
| Cell density | 300 cpsi |
| Wall thickness | 0.305 mm |

This is coated in a coating installation using the process described in WO2006021338. The following steps are carried out for this:

a) aligning the flow channels of the wall-flow filter in vertical fashion such that one end surface lies at the bottom, and the second end surface lies at the top,
b) introducing the coating composition into the filter body through the flow channels of the wall-flow filter which are open in the lower end face up to a desired height above the lower end face
c) removing excess coating composition downward.

The washcoat is at room temperature at the time of coating, which is usually 20° C. to 40° C., and consists of a suspension of a copper-exchanged zeolite (Chabasit) with a solids content of 37%. The suspension is ground in Examples 1-3 by a stirred ball mill (for example from the manufacturer Netsch or Hosokawa Alpine) using zirconium oxide grinding balls having a diameter of 1 mm. After coating, the loading of the support with washcoat is determined by weighing the support.

1. Example: Zeolite-containing washcoat ground with a ball mill, after coating dried standing in a convection oven at 120° C. for 30 minutes, annealed at 350° C. for 30 minutes, then calcined at 550° C. for 2 h (standard process, not according to the invention).
2. Example: Zeolite-containing washcoat ground with a ball mill, support after coating stored standing at room temperature for 24 hours, then dried at 120° C. for 30 minutes, annealed at 350° C. for 30 minutes and calcined at 550° C. for 2 h (not according to the invention).
3. Example: Zeolite-containing washcoat ground with a ball mill, pre-dried using the method according to the invention under the following conditions
   Pressure difference: 350 mbar
   Moisture content: 4 g water/kilogram air
   Air temperature at inlet: 20° C.
   Solids content after pre-drying: 53%; then dried at 120° C. for 30 minutes, annealed at
   350° C. for 30 minutes and calcined at 550° C. for 2 h.

Table 3 gives the results of the measurements of the concentration gradients, exhaust gas back pressures and NOx conversion rates of the differently produced wall-flow filters.

TABLE 3

Data for characterization of the filters from Examples 1 to 3

| Example | Loading (g/L) | Solids after pre-drying (%) | Pressure increase at 600 m³/h (%) | Washcoat gradient (%) | X (NOx) at 250° C. after aging (%) |
|---|---|---|---|---|---|
| 1 | 105 | — | 28% | 11.1 | 41% |
| 2 | 107 | — | 43% | 14.3 | 31% |
| 3 | 101 | 53.7% | 18% | 2.7 | 49% |

It can be seen from the examples that the low-temperature pressure difference pre-drying results in a marked improvement in the catalytic effectiveness in the selective catalytic reduction of NOx. This is shown in detail in FIG. 2 in the representation of the conversion over the temperature range of 175° C. to 350° C., in which Example 3 shows the highest conversion in NOx conversion despite the lowest loading of catalytically active material.

FIG. 2: NOx conversion of Examples 1-3 at T=175° C.-350° C. at the model gas under the gas composition given in Table 1.

The worst (highest) exhaust gas back pressure with a pressure increase of 43% is found for the filter slowly dried at room temperature. Compared to the filter dried conventionally with circulating air (Example 1, standard process), the filters which were treated using the low-temperature pressure difference pre-drying method (Example 3) show a marked improvement, i.e. a reduction of the exhaust gas back pressure.

A significant improvement when using the pre-drying according to the invention can also be observed in particular in the axial distribution of the washcoat. The difference in the axial distribution of the mass of catalytic substance after the pre-drying is only 2.7%.

The invention claimed is:

1. Method for producing a catalyst containing zeolites or zeotypes for the aftertreatment of exhaust gases of an internal combustion engine, characterized in that the zeolite or the zeotype is a metal ion-exchanged zeolite or zeotype and, after it is coated onto and/or into a support, is pre-dried in such a way that a gas stream is guided through the support for a sufficient period of time and with a sufficient intensity, so that the solids content in the applied washcoat layer is set to 45%-60% before the support is completely dried and/or calcined.

2. Method according to claim 1, characterized in that zeolites or zeotypes are those derived from structure types selected from the group consisting of CHA, LEV, AEI, AFX, AFI or KFI framework or a mixture thereof.

3. Method according to claim 1, characterized in that the zeolite or zeotype is exchanged with iron and/or copper ions.

4. Method according to claim 1, characterized in that the coating has a binder selected from the group consisting of aluminum oxide, titanium dioxide, zirconium dioxide, silicon dioxide or mixtures thereof.

5. Method according to claim 1, characterized in that the support is a wall-flow filter.

6. Method according to claim 1, characterized in that the gas stream lasts for a period of time of 10 to 120 seconds.

7. Method according to claim 1, characterized in that the moisture of the gas stream is reduced to values of less than 5 g of water per kilogram of gas.

8. Method according to claim 1, characterized in that the gas stream does not exceed a temperature of 60° C.

9. Method according to claim 1, characterized in that the gas stream is generated by a pressure difference of more than 20 mbar between the inlet and outlet sides of the support.

10. Method according to claim 1, characterized in that the gas stream is sucked through the support in the direction of coating.

11. Method according to claim 1, characterized in that the coating suspension is treated with ultrasound prior to coating the support.

12. Catalyst for the aftertreatment of exhaust gases of an internal combustion engine produced according to claim 1.

13. Catalyst according to claim 12, characterized in that the support is a wall-flow filter.

14. Catalyst according to claim 13, characterized in that the support has a loading with the coating of 30-200 g/l.

15. Catalyst according to claim 14, characterized in that the support has less than 10% of a gradient with respect to the washcoat concentration and/or the copper content in the axial direction.

16. A method for the aftertreatment of exhaust gases of an internal combustion engine comprising contacting the exhaust gases with the catalyst according to claim 12.

17. Method according to claim 16, characterized in that these are exhaust gases of a predominantly on average lean-operated internal combustion engine.

18. Method according to claim 16, characterized in that the catalyst is configured for the selective reduction of nitrogen oxides by means of ammonia.

* * * * *